US008775638B2

(12) United States Patent
Dorn et al.

(10) Patent No.: US 8,775,638 B2
(45) Date of Patent: Jul. 8, 2014

(54) METHOD, COMPUTER READABLE MEDIUM AND SYSTEM FOR SCALING MEDICAL APPLICATIONS IN A PUBLIC CLOUD DATA CENTER

(75) Inventors: Karlheinz Dorn, Kalchreuth (DE); Vladyslav Ukis, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 65 days.

(21) Appl. No.: 13/364,627

(22) Filed: Feb. 2, 2012

(65) Prior Publication Data

US 2013/0205031 A1     Aug. 8, 2013

(51) Int. Cl.
*G06F 15/16*     (2006.01)
*G06F 9/50*      (2006.01)
*H04L 29/08*     (2006.01)

(52) U.S. Cl.
CPC ............ *G06F 9/5072* (2013.01); *G06F 15/16* (2013.01); *G06F 15/161* (2013.01); *H04L 67/10* (2013.01)
USPC ........................... 709/227; 709/228; 709/229

(58) Field of Classification Search
CPC ....... H04L 67/10; G06F 9/5072; G06F 15/16; G06F 15/161
USPC .................. 709/201–207, 212–229, 248–250
See application file for complete search history.

(56) References Cited

U.S. PATENT DOCUMENTS

| 2008/0305815 | A1* | 12/2008 | McDonough | 455/466 |
|---|---|---|---|---|
| 2009/0210929 | A1* | 8/2009 | Zill et al. | 726/4 |
| 2010/0042675 | A1* | 2/2010 | Fujii | 709/203 |
| 2010/0223378 | A1* | 9/2010 | Wei | 709/224 |
| 2010/0229108 | A1* | 9/2010 | Gerson et al. | 715/757 |
| 2011/0055317 | A1* | 3/2011 | Vonog et al. | 709/203 |
| 2011/0055398 | A1* | 3/2011 | Dehaan et al. | 709/226 |
| 2011/0185063 | A1* | 7/2011 | Head et al. | 709/226 |
| 2011/0213691 | A1* | 9/2011 | Ferris et al. | 705/37 |
| 2011/0283202 | A1* | 11/2011 | Drews et al. | 715/752 |
| 2012/0047239 | A1* | 2/2012 | Donahue et al. | 709/220 |
| 2012/0209968 | A1* | 8/2012 | Lawson et al. | 709/220 |
| 2012/0215582 | A1* | 8/2012 | Petri et al. | 705/7.27 |
| 2012/0271927 | A1* | 10/2012 | Shakirzyanov et al. | 709/220 |
| 2012/0297059 | A1* | 11/2012 | Bross | 709/224 |
| 2012/0303818 | A1* | 11/2012 | Thibeault et al. | 709/226 |
| 2012/0311609 | A1* | 12/2012 | Taylor et al. | 719/313 |

(Continued)

OTHER PUBLICATIONS

Rochwerger (Rochwerger B., The reservoir model and architecture for open federated cloud computing, 2009, International Business Machines Corporation, vol. 53, No. 4, Paper 4, p. 4-10).*

(Continued)

*Primary Examiner* — Brian J Gillis
*Assistant Examiner* — Michael A Keller
(74) *Attorney, Agent, or Firm* — Harness, Dickey & Pierce, P.L.C.

(57) ABSTRACT

A method for providing scaled applications in a cloud data center is disclosed. The method includes receiving a request from a user to use one of a plurality of applications maintained in a memory of a cloud data center. The method further includes assigning one of a plurality of instantiations of a service manager to the user and establishing, using the assigned instantiation of the service manager, a connection between the user and an instance of the requested application for a duration of a user session.

24 Claims, 7 Drawing Sheets

(56) References Cited

U.S. PATENT DOCUMENTS

| | | | |
|---|---|---|---|
| 2012/0324067 A1* | 12/2012 | Hari et al. | 709/222 |
| 2013/0007753 A1* | 1/2013 | Jain | 718/103 |
| 2013/0132944 A1* | 5/2013 | Davis | 718/1 |
| 2013/0138810 A1* | 5/2013 | Binyamin et al. | 709/225 |
| 2013/0198249 A1* | 8/2013 | Hoang et al. | 707/825 |
| 2013/0198653 A1* | 8/2013 | Tse et al. | 715/751 |
| 2013/0238791 A1* | 9/2013 | Anderson et al. | 709/224 |

OTHER PUBLICATIONS

Brown (Brown A., Trusted Platform-as-a-Service: A Foundation for Trustworthy Cloud-Hosted Applications, Oct. 21, 2011, Duke University Department of Computer Science, p. 17-20).*

* cited by examiner

METHOD, COMPUTER READABLE MEDIUM AND SYSTEM FOR SCALING MEDICAL APPLICATIONS IN A PUBLIC CLOUD DATA CENTER

BACKGROUND

1. Field

Embodiments generally relate to deployment and invocation of scaled medical imaging applications in a public cloud data center.

2. Related Art

"Cloud computing" refers to the utilization of a set of shared computing resources, such as servers, which are typically consolidated in one or more data center locations. A cloud-based computing resource can be considered to execute or reside on a "cloud," which may be an internal corporate network or the public Internet, for example. From the perspective of an application developer or corporate systems administrator, cloud computing enables the development and deployment of applications that exhibit scalability, meaning that resource utilization can be easily and dynamically increased without regard for the nature or location of the underlying infrastructure executing the applications or other services.

Public cloud providers are currently capable of providing nearly unlimited scalability of applications. Scalability, as it pertains to applications, means that several instances of an application may be started by a cloud management system as needed. If the number of users requesting an application increases, the number of instances of the application that are started by the cloud management system are increased as well. If the number of application users decreases, then the number of running application instances is decreased, and accordingly, the cost for operating the application will drop.

This dynamic provisioning of application instances is made possible by the underlying elasticity of the public cloud data center. In the dynamic provisioning process, the several running instances are not tied to the clients sending a request. Rather, the cloud management system allocates a running application instance to a client only for the duration of a single user request. The cloud management system typically allocates available application instances to clients using a Round Robin method.

When application instances are completely stateless, i.e., when the application instances can be quickly and easily configured "on the fly" such that access to an application is completely separate from the execution of the application, such a dynamic provisioning process can be sufficient for providing unlimited application scalability.

In conventional cloud computing systems, as in example embodiments, several applications may be maintained in the cloud data center. However, in contrast to example embodiments, a cloud management module in a conventional system may assign instances of the requested application in a Round Robin fashion, for example. In conventional systems, user data may be loaded into memory when the user is assigned an application instance. The next time the user requests the services of the same application, even when the user has maintained the same user session, there is no guarantee that the user will be assigned the same instance of the requested application. Before any further processing may be performed, this second assigned instance is required to re-load data needed by the user in order for the user to be able to utilize the application. In some types of applications, such as, for example, medical imaging applications, loading this data may require a noticeable amount of time and may in some circumstances render the application inoperable in the view of the user.

SUMMARY

The inventors of the present application recognize, in the case of medical imaging applications for example, that a user will likely require that the application load extensive medical data into memory. This loading may require a non-negligible amount of time. These medical imaging applications, therefore, cannot be said to be stateless.

Further, data required by an application must remain available to the application throughout a user session in which the user works with the application. However, the user may pose several requests to the system during the user session. In conventional systems, an instance of the application must be loaded one time for each user request. As such, the inventors recognize that this further requires that medical image data be loaded one time for each user request. Because each loading may require a non-negligible amount of time, this repeated loading of data may detract from the user's experience to the extent that the application is rendered inoperable or nearly inoperable.

The inventors note that a fixed allocation of an instance to a single user, throughout a user session including several user requests, may resolve the problem of repeated loading of extensive medical image data. However, the inventors further note that public cloud providers do not currently support fixed allocation of instances to users. As a result, the inventors recognize that medical imaging applications cannot be scaled in the public cloud because of the large amounts of data that must be loaded in order to use many medical imaging applications.

Accordingly, the inventors propose, for example, in the context of medical imaging applications executed in a public cloud, that an instantiation of a service manager be provided for each user upon an initial user request, and that this service manager instantiate a single application instance for use by that single user throughout a user session, requiring that data be loaded into memory only one time for the entire user session.

One embodiment of the present application is directed to a method. The method includes receiving a request from a user to use one of a plurality of applications maintained in a memory of a cloud data center; assigning one of a plurality of instantiations of a service manager to the user; and establishing, using the assigned instantiation of the service manager, a connection between the user and an instance of the requested application for a duration of a user session.

Another embodiment of the present application is directed to a method. The method includes requesting, by a computing device, to use an application of a cloud data center, establishing a connection to one of a plurality of instantiations of a service manager of the cloud data center, and using, by the computing device, an instance of the requested application for a duration of a user session.

A further embodiment of the present application is directed to a system. The system includes a network interface to a cloud data center. The system further includes a processor adapted to communicate with a memory. The processor is configured to maintain a plurality of instantiations of a service manager. The plurality of instantiations of the service manager are executable on the processor. The processor is further configured to receive, via the network interface, a request from a user to use one of a plurality of applications maintained in the cloud data center; assign one of the plurality of instantiations of the service manager to the user; and establish, using the assigned instantiation of the service manager, a connection between the user and an instance of the requested application for a duration of a user session.

A still further embodiment of the present application is directed to a system. The system includes a network interface. The system further includes at least one computing device. The at least one computing device is configured to request, via the network interface, to use an application of a cloud data center; to establish a connection to one of a plurality of instantiations of a service manager of the cloud data center; and to use an instance of the requested application for a duration of a user session.

BRIEF DESCRIPTION OF THE DRAWINGS

The present invention will become more fully understood from the detailed description of example embodiments given herein below and the accompanying drawings, wherein like elements are represented by like reference numerals, which are given by way of illustration only and thus are not limiting of the present invention and wherein.

Various embodiments of the present disclosure will now be described more fully with reference to the accompanying drawings. Like elements on the drawings are labeled by like reference numerals.

DETAILED DESCRIPTION OF THE EMBODIMENTS

Figure 1:
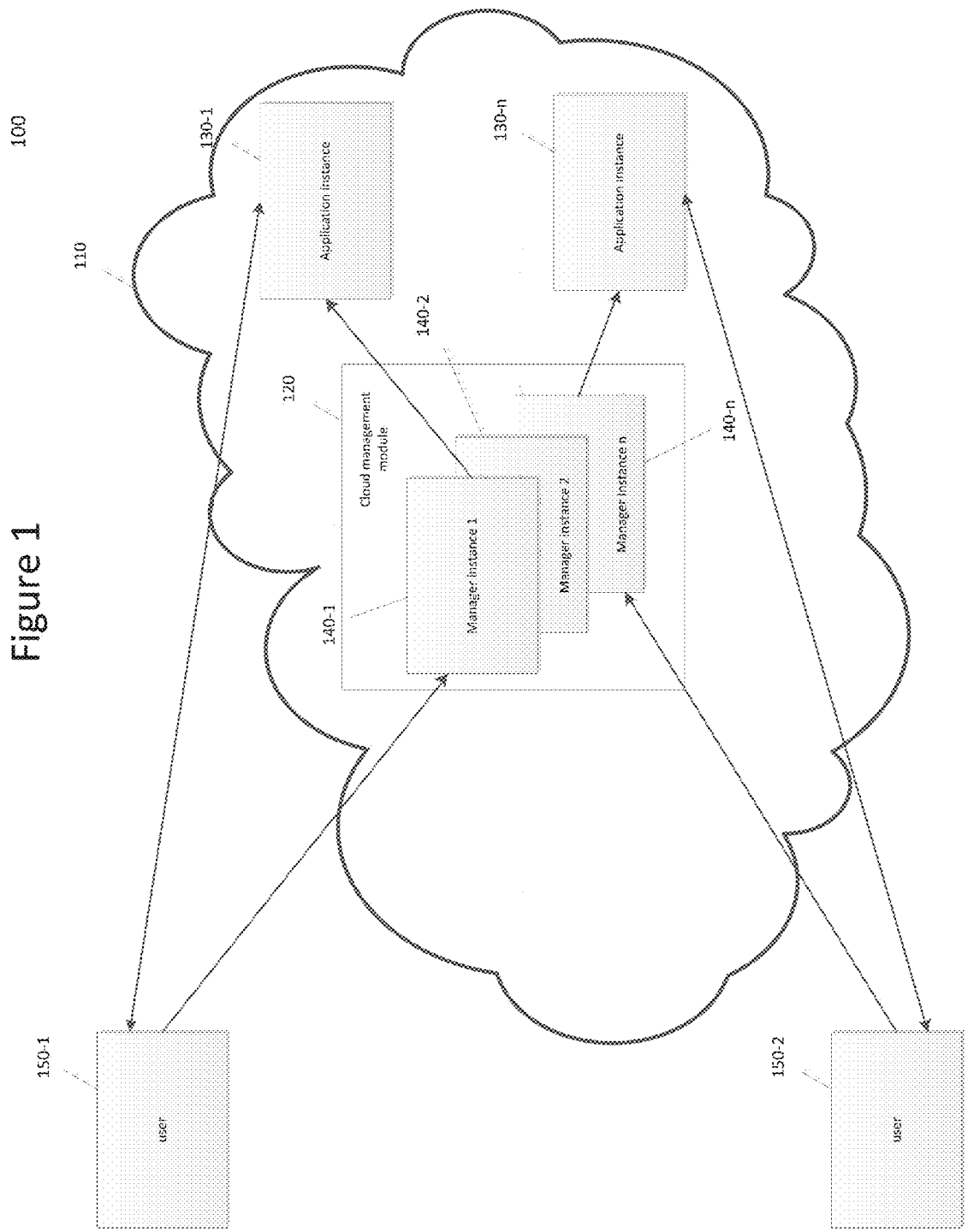
FIG. 1 illustrates a system for supporting scaled applications according to at least one example embodiment.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Example embodiments of the present application include a method and system for providing scaled applications in a public cloud data center. In example embodiments, instantiations of a service manager are installed in the public cloud data center and are managed by a cloud management module. The cloud management module assigns instantiations of the service manager to a user when a user requests use of an application maintained in the public cloud data center.

In example embodiments, each instantiation of the service manager includes mechanisms for controlling the number of running instances of applications. When receiving a user request, the assigned instantiation of the service manager deploys an instance of the application and returns the address of this instance to the requesting user. The user then works with that single instance of the application throughout a user session. When the user has finished using the application, the instantiation of the service manager frees the instance of the application. The cloud management module is then further notified that this instantiation of the service manager is available to be assigned to other users. Assigning instantiation of the service manager may occur through a Round Robin assignment mechanism, for example.

Example embodiments provide unlimited scalability of applications in a public cloud data center by fixedly allocating one instance of an application to a user. Because only one instance of the application is loaded for a user session, loading of extensive amounts of data takes place only once for a user session. In example embodiments, an application therefore can respond to an unlimited or nearly unlimited number of user requests because the application has dynamic scalability.

FIG. 1 illustrates an example embodiment of a system 100 in which methods of providing scaled applications of a cloud data center are implemented. As shown in FIG. 1, the system 100 includes a cloud data center 110, in which applications and systems for management of applications, servers, data storage systems, and other computing resources can operate. As used herein, a "cloud" may include a collection of resources that can be invoked for a limited or defined duration, for example.

As shown for example in FIG. 1, the cloud includes a cloud management module 120. The cloud management module 120 includes a dedicated or centralized server and/or other software, hardware, and network tools that communicate via one or more networks such as the Internet or other public or private network with all instances 130-1 through 130-n of one or several applications. The cloud management module 120 includes one or more instantiations 140-1 through 140-n of a service manager. These instantiations 140-1 through 140-n of the service manager in turn invoke one of the application instances 130-1 through 130-n of the one or several applications for use throughout the duration of a user session of a user 150-1 through 150-n. Because a user 150-1 through 150-n is assigned to a single application instance 130-1 through 130-n for the duration of a user session, user data only needs to be loaded one time in a user session.

It will be understood that the cloud data center 110 may support and maintain one or several applications, and there may be one or several instances of each application executing in the cloud at any point in time. The number of instances of each application executing at any given time may be, for example, configured dynamically according to application logic of each application, or defined according to a configuration setting of the application.

User 150-n may request an instance of the same application as that requested by user 150-1. User 150-n may request an instance of a different application than that requested by user 150-1. It should be understood that any number of users 150-1 through 150-n may be assigned any number of instances 130-1 through 130-n of same or unique applications supported in cloud data center 110.

The architecture and operation of the cloud management module 120 is described below in further detail with respect to FIG. 2. A method for providing scaled applications in a public cloud data center is described with respect to FIG. 3. The method for providing scaled applications in a public cloud data center is described in further detail with respect to FIG. 4. A system for using a scaled application of a public cloud data center is described with respect to FIG. 5. A method for invoking applications of a cloud data center is described with respect to FIG. 6. A system for supporting scaled medical imaging applications of a cloud data center is described with respect to FIG. 7.

Figure 2:
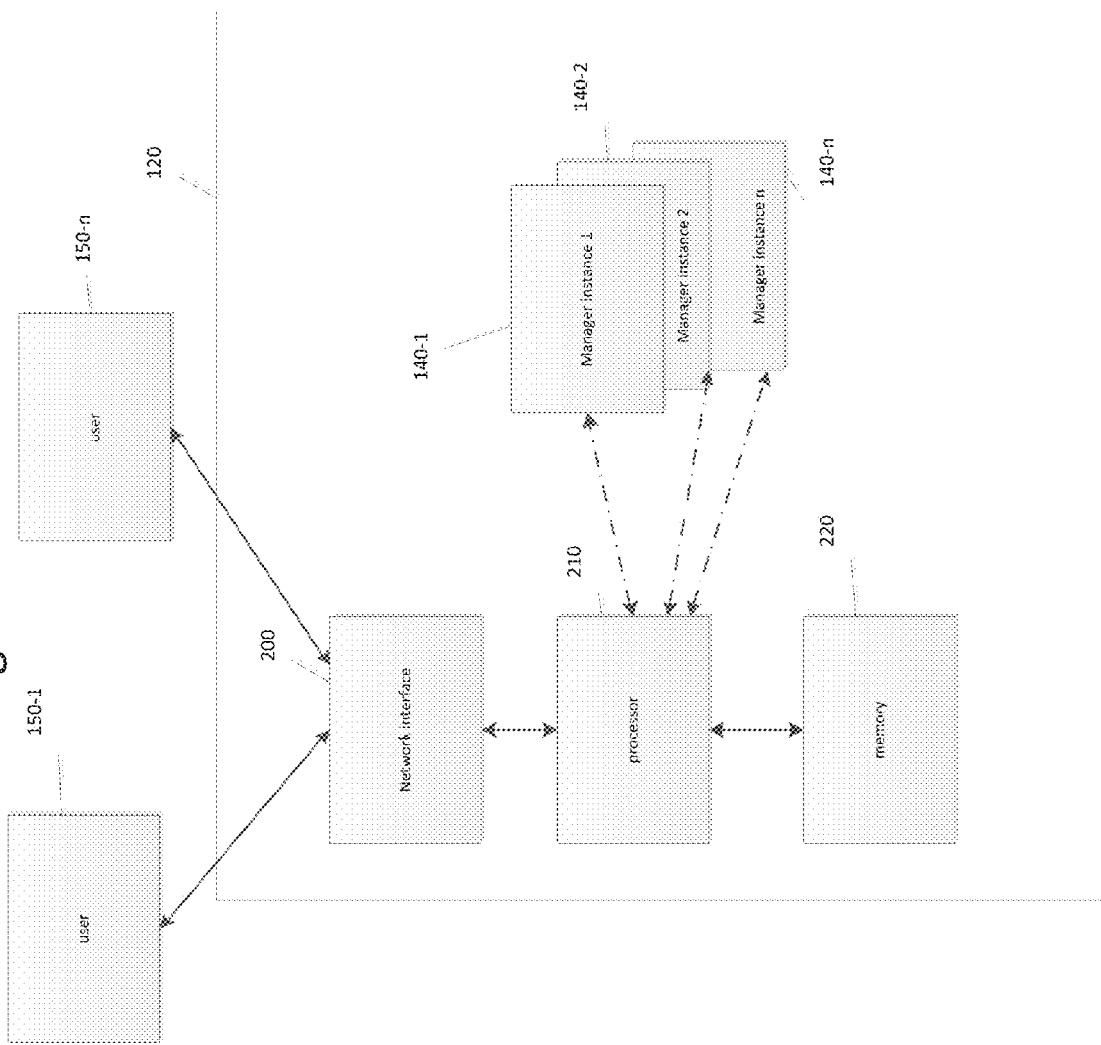
FIG. 2 illustrates an architecture of a cloud management module according to at least one example embodiment.

FIG. 2 is a block diagram of an example system, such as a cloud management module 120, for example, which may be utilized to implement methods according to example embodiments of the present application. The cloud management module 120 includes at least a network interface 200 to a cloud data center, a processor 210, and a memory 220, the processor 210 being adapted to communicate with the memory 220 and adapted to communicate with any of users 150-1 through 150-n via network interface 200. The processor 210 is further adapted to maintain a plurality of instantiations of a service manager 140-1 through 140-n. The service manager instantiations 140-1 through 140-n may be executed on the processor 210 according to example embodiments.

A user 150-1 communicates with the cloud management module 120 through network interface 200. It will be understood that a user 150-1 may communicate with the cloud management module 120 using one or more conventional communication protocols, such as the hypertext transfer protocol (HTTP) or the simple object access protocol (SOAP) for example. Other embodiments may utilize one or several other communication protocols. The user 150-1 may be a conventional web browser application, a desktop/laptop computing system executing a software application, a wireless device, any other computational device or system, etc.

In one example embodiment, the cloud management module 120 receives, via the network interface 200, a request from the user 150-1 to use one of a plurality of applications maintained in the cloud data center. The cloud management module 120 creates a new service manager instantiation 140-1 through 140-n based on the user request and assigns the new service manager instantiation 140-1 through 140-n to the user 150-1. The assignment may be performed by, for example, cloud platform-specific API calls.

The assignment may return a Uniform Resource Locator (URL) to the user for using the assigned service manager instantiation. The URL may be generated by a cloud platform. The cloud management module 120 may increment a numerical value in a configuration file to reflect that a new instantiation of the service manager has been created. The cloud platform may initiate execution of the new instantiation of the service manager 140-1 through 140-n on the processor 210 based on the incrementing of the numerical value in the configuration file.

In example embodiments, the assigning may occur after the cloud management module 120 examines memory 220 for a user session state corresponding to user 150-1. If there is no corresponding user session state for user 150-1, the cloud management module determines that the user 150-1 wishes to initiate a new session and the cloud management module 120 assigns a service manager instantiation 140-1. In example embodiments, the assigning may occur after a user authentication process.

The assigned service manager instantiation 140-1 through 140-n then establishes a connection between the requesting user 150-1 and an instance of the requested application 130-1 through 130-n (shown in FIG. 1). The established connection is maintained throughout the user 150-1 session. The connection may be established by user 150-1 invocation of a second URL received from the assigned service manager instantiation 140-1 through 140-n. The second URL may be generated by the cloud platform. The second URL includes parameters for using the instance of the requested application 130-1 through 130-n. Example embodiments do not require reloading of data because a user 150-1 is assured the use of the same application instance throughout a user session.

The cloud management module 120 may assign a second user 150-n to a second instantiation 140-n of the service manager based on a request by the second user 150-n to use an application of the cloud data center 110. The second request by the second user 150-n may be for the use of a different application from that requested by the first user 150-1. The second request by the second user 150-n may be for use of the same application requested by the first user 150-1. The cloud management module 120 may assign service manager instantiations 140-1 through 140-n according to a Round Robin load balancing mechanism, for example.

The assigned service manager instantiation 140-1 through 140-n may remove the assigned instance 130-1 of the requested application subsequent to a user request to terminate use of the instance 130-1 of the requested application. The user 150-1 request to terminate use of the requested application may be determined based upon the user being idle for a configurable amount of time, for example. The assigned instance 130-1 may be removed using platform-specific API calls. The cloud management module 120 may decrement the numerical value of the configuration file to cause the cloud platform to remove the assigned service manager instantiation 140-1 through 140-n from execution on the processor 210.

The requested application may be a medical imaging service such as a two-dimensional (2D) or three-dimensional (3D) imaging application for use in pathology and mammography, for example.

Figure 3:
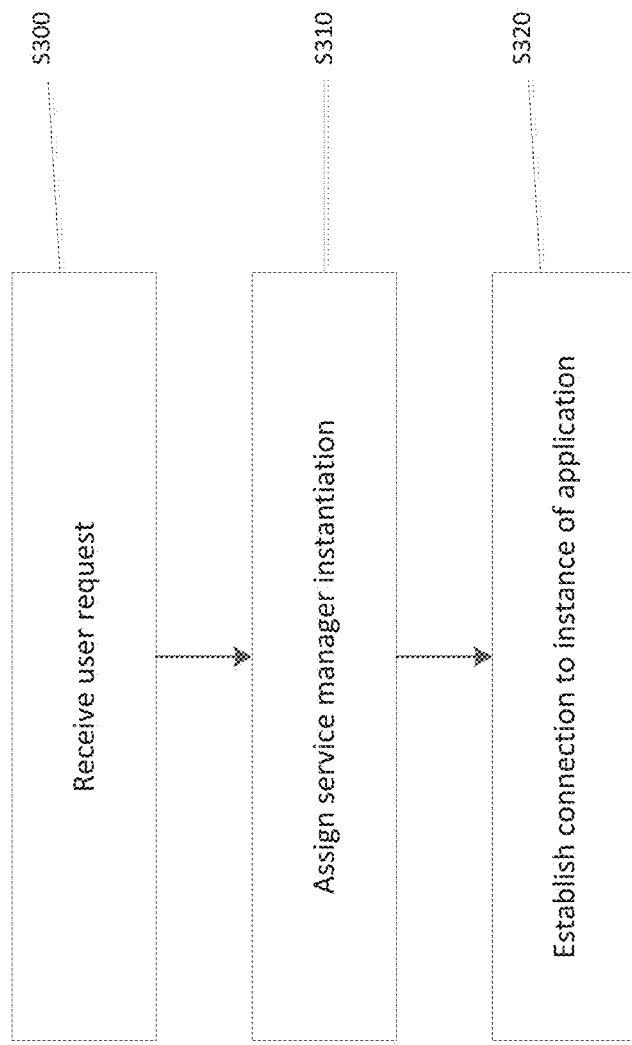
FIG. 3 illustrates a method for deploying scaled applications according to at least one example embodiment.

FIG. 3 illustrates a method for providing scaled applications according to an example embodiment. Reference is made to elements of FIGS. 1 and 2 through the use of like reference numerals.

In step S300, the cloud management module 120 receives, via a network interface 200 operatively connected to the processor 210 for example, a request from a user 150-1 to use one of the applications maintained in a memory by the cloud data center 110. At step S310, the cloud management module 120 assigns one of a plurality of instantiations of a service manager 140-1 through 140-n to the user 150-1. In example embodiments, as described above with regard to FIG. 2, the cloud management module 120 may create a new service manager instantiation 140-1 through 140-n based on the user request and the cloud management module may assign the new service manager instantiation 140-1 through 140-n to the user 140-1. The assignment may be performed by, for example, cloud platform-specific API calls.

The assignment may return a URL to the user 150-1 for using the assigned service manager instantiation. The URL may be generated by a cloud platform. The cloud management module 120 may increment a numerical value in a configuration file to reflect that a new instantiation of the service manager has been created. The cloud platform may initiate execution of the new instantiation of the service manager 140-1 through 140-n on the processor 210 based on the incrementing of the numerical value in the configuration file.

In example embodiments, the cloud management module 120 may assign an instantiation 140-1 through 140-n of the service manager after examining the memory 220 for a user session state corresponding to user 150-1. If there is no corresponding user session state for user 150-1, the cloud management module 120 may then determine that the user 140-1 wishes to initiate a new session and the cloud management module 120 then assigns an instantiation of the service manager to the user 150-1. In example embodiments, the assigning may occur after a user authentication process.

At step S320, the assigned instantiation of the service manager 140-1 through 140-n establishes a connection between the user 150-1 and an instance of the requested application 130-1 through 130-n. The connection may be established by user 150-1 invocation of a second URL received from the assigned service manager instantiation 140-1 through 140-n. The second URL may be generated by the cloud platform. The second URL includes parameters for using the instance of the requested application 130-1 through 130-n. The established connection is maintained to the same instance of the requested application 130-1 through 130-n throughout the duration of a user session. Example embodiments do not require re-loading of data because a user 150-1 is assured the use of the same application instance throughout a user session.

The cloud management module 120 may assign a second user 150-n to a second instantiation 140-n of the service manager based upon a request by the second user 150-n to use an application maintained in the cloud data center 110. The second request by the second user 150-n may be for use of a different application as that requested by the first user 150-1. The second request by the second user 150-n may be for use of the same application requested by the first user 150-1. The cloud management module 120 may assign instantiations 140-1 through 140-n of the service manager in a Round Robin fashion.

As described above with regard to FIG. 2, the assigned service manager instantiation 140-1 through 140-n may remove the assigned instance 130-1 of the requested application subsequent to a user being idle for a configurable amount of time, for example. The assigned instance 130-1 may be removed using platform-specific API calls. The cloud management module 120 may decrement the numerical value of the configuration file to cause the cloud platform to remove the assigned service manager instantiation 140-1 through 140-n from execution on the processor 210.

The requested application may be a medical imaging service such as a two-dimensional (2D) or three-dimensional (3D) imaging application for use in pathology and mammography, for example.

Figure 4:
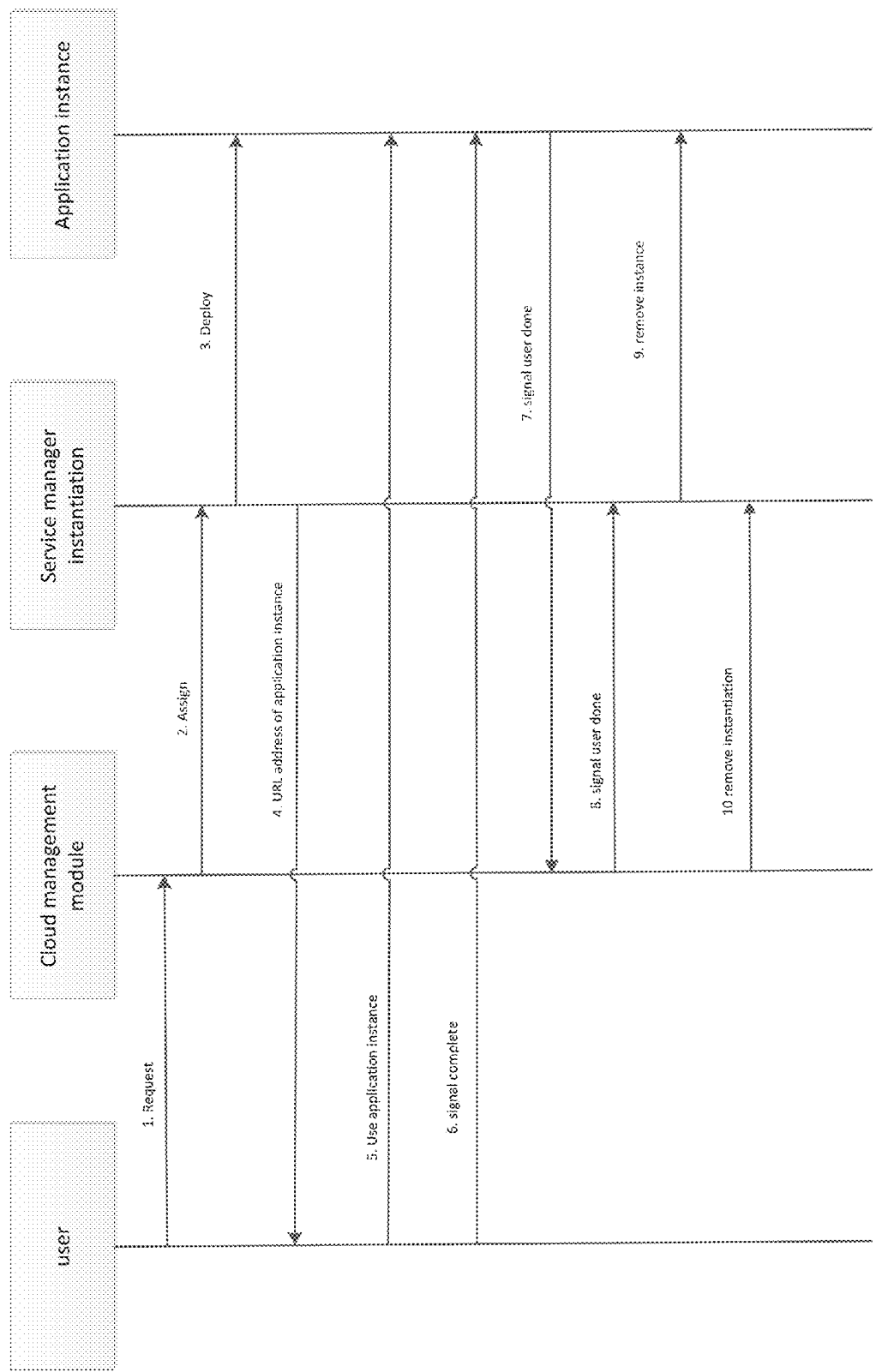
FIG. 4 is a signal diagram illustrates signaling mechanisms to implement a method for deploying scaled applications according to at least one example embodiment.

FIG. 4 is a signal diagram providing further details of the messages to implement an embodiment of the method of FIG. 3, for example.

In message 1, shown in FIG. 4, a cloud management module may receive a user request to use an application maintained in the cloud data center. The request message 1 may include information such as the name of the application requested, or the user location. The cloud management module may then assign an instantiation of a service manager with an assign message 2. The assign message 2 may include information such as the user type of the user making the request, or the location of the user making the request, for example. The instantiation of the service manager may be assigned in a Round Robin fashion, for example. The assignment may be performed by, for example, platform-specific API calls. The assignment may return a Uniform Resource Locator (URL) to the user for using the assigned service manager instantiation. The URL may be generated by a cloud platform. The cloud management module may increment a numerical value in a configuration file to reflect that a new instantiation of the service manager has been created. The cloud platform may initiate execution of the new instantiation of the service manager on the processor based on the incrementing of the numerical value in the configuration file. In example embodiments, the assigning may occur after a user authentication process.

The service manager instantiation may then deploy the requested application instance with a deploy message 3 and establish a connection between the requested application and the user by sending the URL of the deployed application instance to the user in message 4, for example. The connection may be established by user invocation of a URL received from the service manager instantiation. The URL may be generated by the cloud platform. The URL includes parameters for using the requested application. The user may then proceed to use the desired application instance for the duration of a user session 5.

The user may then signal a desire to cease operations using the deployed application instance with message 6. The user may signal the desire to cease operations through any known way such as being idle, closing an application or logging off of a computer system, for example. The deployed application instance, in message 7, may then signal to the cloud management module that the user session is complete. The cloud management module may then signal this information to the service manager instantiation assigned to the user in 8. Subsequent to receiving this message, the service manager instantiation may then remove the application instance using cloud-platform-specific API calls in message 9. Subsequent to the service manager instantiation removing the application instance, the cloud management module may decrement the numerical value of the configuration file to cause the cloud platform to remove the assigned service manager instantiation 140-1 through 140-n from execution on the processor 210 in message 10.

Figure 5:
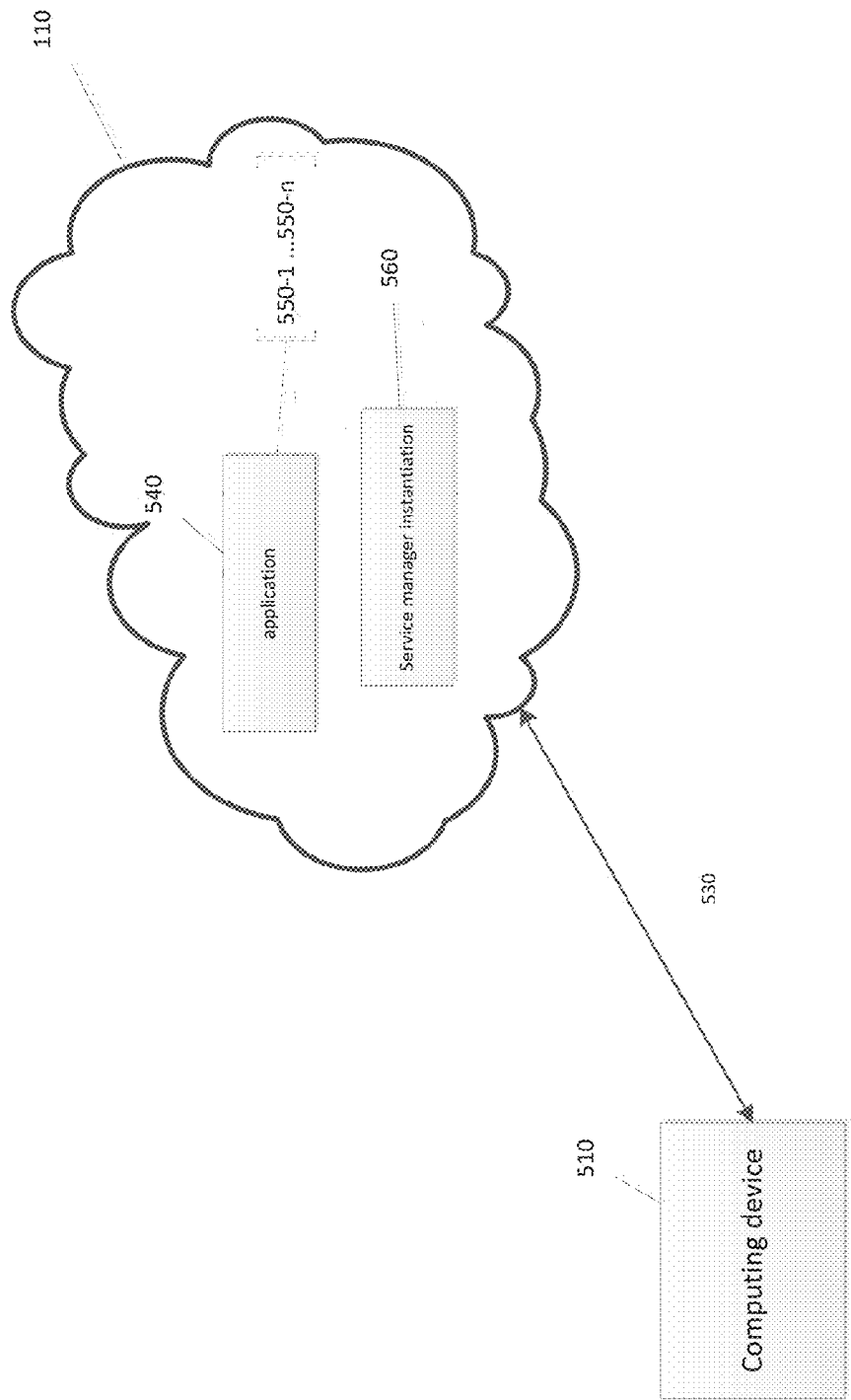
FIG. 5 illustrates a system for using scaled applications according to at least one example embodiment.

FIG. 5 illustrates an example embodiment of a system 500 in which methods of using scaled applications of a cloud data center are implemented according to example embodiments. As shown in FIG. 5, the system 500 includes a network interface 530 and at least one computing device 510. The computing device 510 is adapted to request an application 540 of the cloud data center 110 via the network interface 530. In example embodiments, the computing device 510 establishes a connection to one of a plurality of instantiations of a service manager 560. The computing device 510 is further configured to use a single instance 550-1 through 550-n the application 540 throughout the duration of a user session.

In example embodiments, the computing device 510 is configured to receive, via the service manager 560, a URL address of an instance 550-1 through 550-n of the requested application 540. The computing device 510 may trigger that the computing device 510 wishes to cease operations using the application 540. The computing device 510 may trigger this wish through any known method such as being idle, logging off a system or closing an application. The requested application may be a medical imaging service such as a two-dimensional (2D) or three-dimensional (3D) imaging application for use in pathology and mammography, for example.

Figure 6:
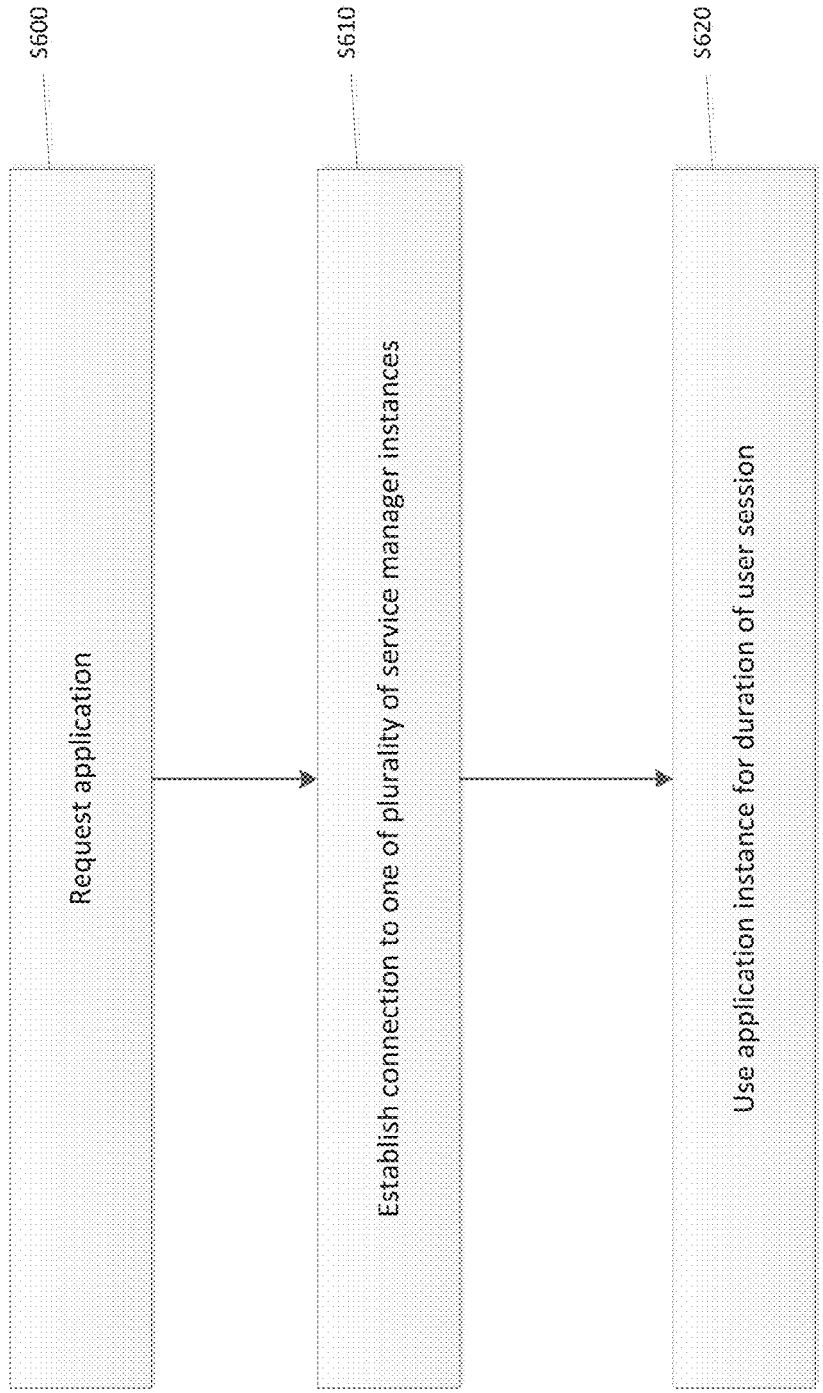
FIG. 6 illustrates a method for invoking scaled applications according to at least one example embodiment.

FIG. 6 illustrates an example embodiment of a method for invoking scaled applications according to example embodiments. Reference is made to elements of FIGS. 1-5 by the use of like reference numerals.

In step S600, a computing device 510 requests the services of an application 540 maintained by a cloud data center 110. As described above with respect to FIG. 3, the request may be compared to a user session state stored by the cloud management module 120 of a cloud data center 110. The computing device 510 may be subjected to authorization protocols according to policies of the cloud data center 110 or the cloud management system 120.

In step S610, the computing device 510 establishes a connection to an instantiation of a plurality of instantiations of a service manager 560. In step S620, the computing device 510 uses an instance 550-1 through 550-n of the requested application for the duration of a user session.

The computing device 510 may receive, from the service manager 560, a URL address of an instance 550-1 through 550-n of the requested application. The computing device 510 may trigger the closing of the instance 550-1 through 550-n of the requested application by, for example, being idle for a configurable amount of time. The requested application may be a medical imaging service such as a two-dimensional (2D) or three-dimensional (3D) imaging application for use in pathology and mammography, for example.

Figure 7:
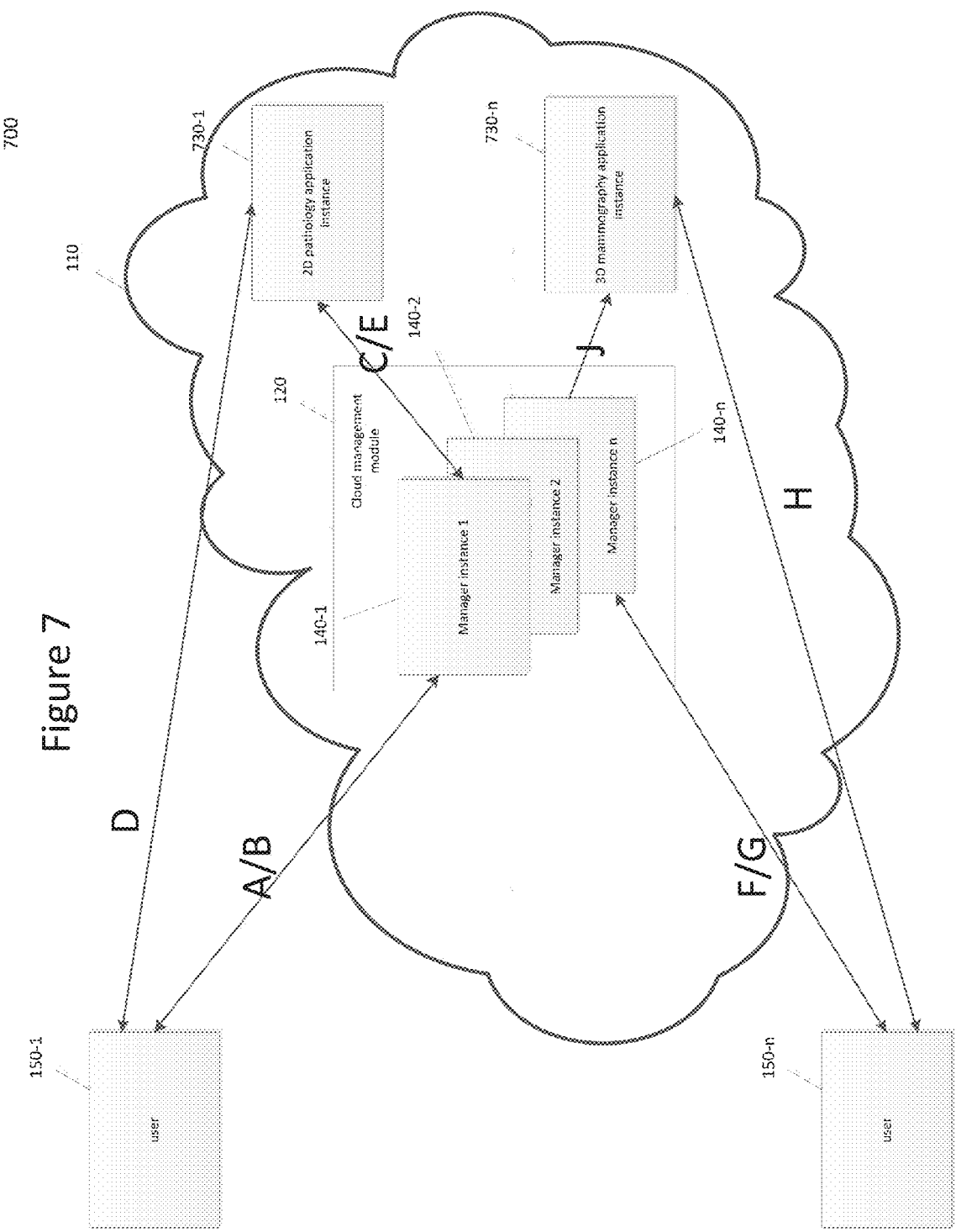
FIG. 7 illustrates a system for supporting scaled medical imaging applications according to at least one example embodiment.

FIG. 7 illustrates an example embodiment of a system for implementing and using a scaled medical imaging application of a cloud data center. Reference is made to elements of FIGS. 1 and 2 through the use of like reference numerals. A detailed explanation of elements already discussed with regard to FIGS. 1 and 2 is omitted for brevity.

As shown in FIG. 7, the system 700 includes a cloud data center 110, in which applications and systems for management of applications, servers, data storage systems, and other computing resources can operate. As shown for example in FIG. 7, the cloud includes a cloud management module 120. The cloud management module 120 includes one or more instantiations 140-1 through 140-n of a service manager. These instantiations 140-1 through 140-n of the service manager in turn invoke one of the application instances 730-1 through 730-n of the one or several medical imaging applications for use throughout the duration of a user session of a user 150-1 through 150-n. The one or several application instances 730-1 through 730-n may be, for example, instances of a 2D or 3D pathology imaging application, a 2D/3D mammography imaging application, or any other known medical imaging application. The one or several application instances 730-1 through 730-n may be instances of the same medical imaging application, or of different medical imaging applications, or any combination thereof. The number of instances of each application executing at any given time may be, for example, configured dynamically according to application logic of each application, or defined according to a configuration setting of the application.

Because a user 150-1 through 150-n is assigned to a single application instance 730-1 through 730-n for the duration of a user session, user data only needs to be loaded one time in a user session.

In example embodiments, a user 150-1 may use an application instance 730-1 of a 2D pathology application, for example. The user 150-1 makes a request A to the cloud management module 120 through any known method of network communications. It will be understood that a user 150-1 may communicate with the cloud management module 120 using one or more conventional communication protocols, such as the hypertext transfer protocol (HTTP) or the simple object access protocol (SOAP) for example. Other embodiments may utilize one or several other communication protocols. The user 150-1 may be a conventional web browser application, a desktop/laptop computing system executing a software application, a wireless device, any other computational device or system, etc.

Subsequent to receiving the user 150-1 request A, the cloud management module 120 assigns one of service manager instantiations 140-1 through 140-n to the user 150-1. The assignment may be performed by, for example, platform-specific API calls. The assignment may return B a Uniform Resource Locator (URL) address to the user for using the assigned service manager instantiation. The URL may be generated by a cloud platform. The cloud management module 120 may increment a numerical value in a configuration file to reflect that a new instantiation of the service manager has been created. The cloud platform may initiate execution of the new instantiation of the service manager 140-1 through 140-n on the processor 210 based on the incrementing of the numerical value in the configuration file.

In example embodiments, the assigning may occur after the cloud management module 120 examines memory 220 for a user session state corresponding to user 150-1. If there is no corresponding user session state for user 150-1, the cloud management module determines that the user 150-1 wishes to initiate a new session and the cloud management module 120 assigns a service manager instantiation 140-1. In example embodiments, the assigning may occur after a user authentication process.

The assigned service manager instantiation 140-1 then deploys C an instance 730-1 of the requested medical imaging application. The deployment may be performed, for example, using a platform-specific API call, or any other known method of application invocation.

The assigned service manager instantiation establishes a connection D between the requesting user 150-1 and the instance of the requested medical imaging application 730-1. The established connection is maintained throughout the user 150-1 session. The connection may be established by user 150-1 invocation of a URL received from the assigned service manager instantiation 140-1. The URL may be generated by the cloud platform. The URL includes parameters for using the instance of the requested application 730-1. Example embodiments do not require re-loading of data more than once within a user session because a user 150-1 is assured the use of the same application instance throughout a user session. In example embodiments, data may only be loaded when the user 150-1 is ready to make a diagnosis at the end of a user session.

The cloud management module 120 may assign G a second user 150-n to a second instantiation 140-n of the service manager based on a request F by the second user 150-n to use an application of the cloud data center 110. The second request by the second user 150-n may be for the use of a different application from that requested by the first user 150-1. The second request by the second user 150-n may be for use of the same application requested by the first user 150-1. The cloud management module 120 may assign service manager instantiations 140-1 through 140-n according to a Round Robin load balancing mechanism, for example.

The assigned service manager instantiation 140-1 removes E the assigned instance 730-1 of the requested application subsequent to a user 150-1 request to terminate use of the instance 730-1 of the requested application. The user 150-1 request to terminate use of the requested application may be determined based upon the user being idle for a configurable amount of time, for example.

The instance 730-1 of the requested medical imaging application may be removed by, for example, invoking service management API functions to delete the instance 730-1. Subsequent to the assigned service manager instantiation 140-1 removing the instance 730-1, the cloud management module 120 may then reduce, by updating a configuration file, the number of running instances of the service manager by 1, causing the cloud platform to stop execution of the instance of the service manager on the processor 210.

One embodiment of the present application is directed to a computer readable medium. The computer readable medium includes code segments that, when executed by a processor, cause the processor to receive a request from a user to use one of the applications maintained in a cloud data center and to assign one of a plurality of instantiations of a service manager to the user. The processor may also establish, using the assigned instantiation of the service manager, a connection between the user and an instance of the requested application for a duration of a user session.

One embodiment of the present application is directed to a computer readable medium. The computer readable medium includes code segments that, when executed by a processor, cause the processor to request the use of an application of a cloud data center and to use a single instance of the requested application for a duration of a user session.

Alternative embodiments of the invention may be implemented as a computer program product for use with a computer system, the processor program product being, for example, a series of processor instructions, code segments or program segments stored on a tangible or non-transitory data recording medium (processor readable medium), such as a diskette, CD-ROM, ROM, or fixed disk, or embodied in a computer data signal, the signal being transmitted over a tangible medium or a wireless medium, for example, microwave or infrared. The series of processor instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in form and detail may be made therein without departing from the spirit and scope of the claims. The invention being thus described, it will be obvious that the same may be varied in many ways. Such variations are not to be regarded as a departure from the invention, and all such modifications are intended to be included within the scope of the invention.

We claim:

1. A method, comprising:
   receiving a request from a user to use one of a plurality of applications maintained in a memory of a cloud data center;
   assigning one of a plurality of instantiations of a service manager to the user by,
      determining, via a user session state stored in the memory, if one of the one of the plurality of instantiations of the service manager was previously assigned to the user as a previous instantiation of the service manager,
      assigning the previous instantiation of the service manager to the user as the assigned instantiation of the service manager, upon the determining that one of the one of the plurality of instantiations of the service manager was previously assigned to the user, and
      creating and assigning a new one of the plurality of instantiations of the service manager to the user as the assigned instantiation of the service manager, upon the determining that one of the one of the plurality of instantiations of the service manager was not previously assigned to the user;
   establishing, using the assigned instantiation of the service manager as an intermediary between the user and the requested application, a connection between the user and an instance of the requested application for a duration of a user session such that a same assigned instantiation of the service manager is used to establish the connection between the user and the requested application during subsequent requests from the user to use the requested application during the user session.

2. The method of claim 1, further comprising:
   assigning a second instantiation of the plurality of instantiations of the service manager to a second user based upon a request of the second user to use one of the applications maintained in the cloud data center.

3. The method of claim 2, wherein the second request of the second user is for use of a different application from an application requested by a first user.

4. The method of claim 2, wherein the second request of the second user is for use of the same application as an application requested by a first user.

5. The method of claim 1, wherein the assigning includes a round-robin assigning.

6. The method of claim 1, further comprising:
   removing, using the assigned instantiation of the service manager, the instance of the requested application subsequent to receiving a request by the user to terminate use of the instance of the requested application.

7. The method of claim 1, wherein the applications include medical imaging applications.

8. A method, comprising:
   requesting, by a computing device, to use an application of a cloud data center;
   establishing, by the computing device, a connection to an assigned one of a plurality of instantiations of a service manager of the cloud data center as an intermediary between the computing device and the requested application, the establishing establishing the connection such that,
      the computing device is assigned a previous one of the plurality of instantiations of the service manager as the assigned instantiation of the service manager, upon the cloud data center determining that one of the one of the plurality of instantiations of the service manager was previously assigned to the computing device, and
      the computing device is assigned a new one of the plurality of instantiations of the service manager to the computing device as the assigned instantiation of the service manager, upon the cloud data center determining that one of the one of the plurality of instantiations of the service manager was not previously assigned to the computing device; and
   using, by the computing device, an instance of the requested application for a duration of a user session such that a same assigned instantiation of the service manager is used to establish the connection between the computing device and the requested application during subsequent requests from the computing device to use the requested application.

9. The method of claim 8, further comprising:
   receiving, by the computing device via the instantiation of the service manager, an address of the instance of the requested application.

10. The method of claim 8, further comprising:
    triggering closing of the instance of the requested application.

11. The method of claim 8, wherein the application includes a medical imaging application.

12. A system, comprising:
    a network interface to a cloud data center;
    a processor adapted to communicate with a memory, the processor configured to,
       maintain a plurality of instantiations of a service manager, the plurality of instantiations of the service manager being executable on the processor;
       receive, via the network interface, a request from a user to use one of a plurality of applications maintained in the cloud data center;
       assign one of the plurality of instantiations of the service manager to the user by,
          determining, via a user session state stored in the memory, if one of the one of the plurality of instantiations of the service manager was previously assigned to the user as a previous instantiation of the service manager, assigning the previous instantiation of the service manager to the user as the assigned instantiation of the service manager, upon the determining that one of the one of the plurality of instantiations of the service manager was previously assigned to the user, and creating and assigning a new one of the plurality of instantiations of the service manager to the user as the assigned instantiation of the service manager, upon the determining that one of the one of the plurality of instantiations of the service manager was not previously assigned to the user; and establish, using the assigned instantiation of the service manager as an intermediary between the user and the requested application, a connection between the user and an instance of the requested application for a duration of a user session such that a same assigned instantiation of the service manager is used to establish the connection between the computing device and the requested application during subsequent requests from the computing device to use the requested application during the user session.

13. The system of claim 12, wherein the processor is further configured to assign a second instantiation of the plurality of instantiations of the service manager to a second user based upon a request of the second user to use one of the applications maintained in the cloud data center.

14. The system of claim 13, wherein the second request of the second user is for use of the a different application from an application requested by a first user.

15. The system of claim 13, wherein second request of the second user is for use of the same application as the application requested by a first user.

16. The system of claim 13, wherein the processor assigns one of the plurality of instantiations of service managers using a round-robin assignment.

17. The system of claim 12, wherein the processor is further configured to remove, via the assigned instantiation of the service manager, the instance of the requested application subsequent to receiving a request by the user to terminate use of the instance of the requested application.

18. The system of claim 12, wherein the applications include medical imaging applications.

19. A system, comprising:
a network interface;
at least one computing device, the at least one computing device configured to,
    request, via the network interface, to use an application of a cloud data center;
    establish a connection to an assigned one of a plurality of instantiations of a service manager of the cloud data center as an intermediary between the computing device and the requested application, the establishing establishing the connection such that,
        the computing device is assigned a previous one of the plurality of instantiations of the service manager as the assigned instantiation of the service manager, upon the cloud data center determining that one of the one of the plurality of instantiations of the service manager was previously assigned to the computing device, and
        the computing device is assigned a new one of the plurality of instantiations of the service manager to the computing device as the assigned instantiation of the service manager, upon the cloud data center determining that one of the one of the plurality of instantiations of the service manager was not previously assigned to the computing device; and
    use an instance of the requested application for a duration of a user session such that a same assigned instantiation of the service manager is used to establish the connection between the computing device and the requested application during subsequent requests from the computing device to use the requested application during the user session.

20. The system of claim 19, wherein the at least one computing device is further configured to:
receive, via the instantiation of the service manager, an address of the instance of the requested application.

21. The system of claim 19, wherein the at least one computing device is further configured to:
trigger closing of the instance of the requested application.

22. The system of claim 19, wherein the application includes a medical imaging application.

23. A non-transitory computer-readable medium having software code thereon, which, when executed by a computer, cause the computer to perform the method of claim 1.

24. A non-transitory computer-readable medium having software code thereon which, when executed by a computer, cause the computer to perform the method of claim 8.

* * * * *